Aug. 31, 1954   W. G. SCHNEIDER ET AL   2,688,055
ENGINE IGNITION TIMING APPARATUS
Filed Jan. 21, 1950   2 Sheets-Sheet 2
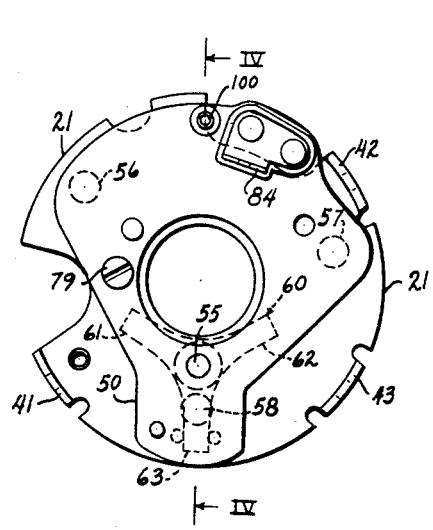
Fig. III
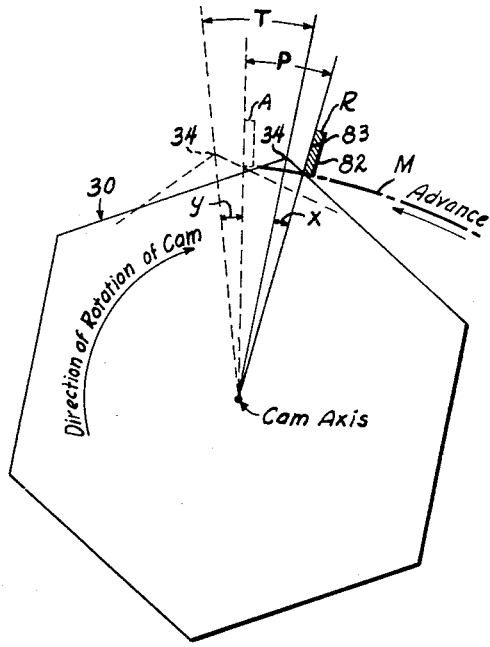
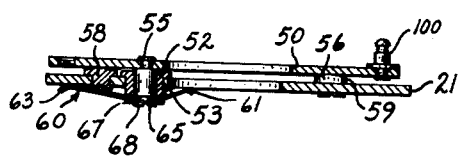
Fig. IV
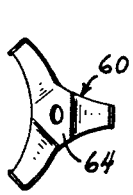
Fig. V
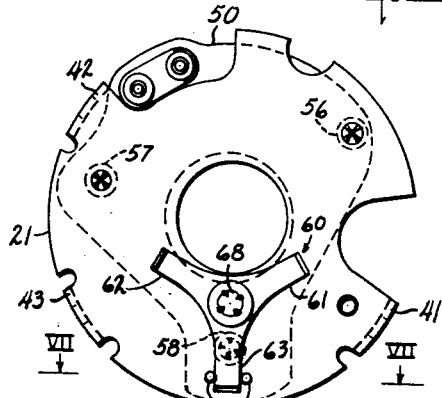
Fig. VI
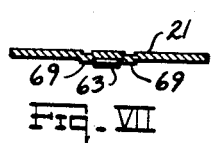
Fig. VII
Fig. VIII
INVENTORS
William G. Schneider
Leslie H. Middleton
BY
Falvey, Souther & Stoltenberg

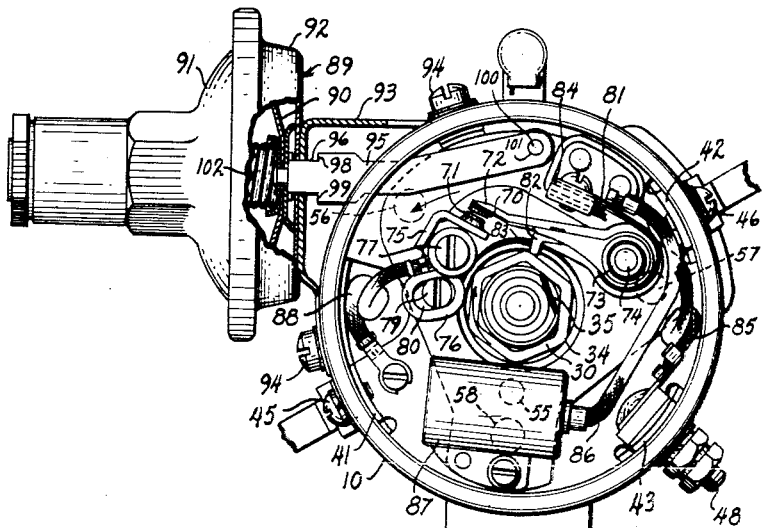

UNITED STATES PATENT OFFICE 2,688,055

ENGINE IGNITION TIMING APPARATUS

William G. Schneider, Maumee, and Leslie H. Middleton, Toledo, Ohio, assignors to The Electric Auto-Lite Company, Toledo, Ohio, a corporation of Ohio Application January 21, 1950, Serial No. 139,926

12 Claims. (Cl. 200—31)

This invention relates to ignition apparatus for internal combustion engines with particular reference to the timing of the ignition in response to the engine suction.

The invention embraces an ignition timing mechanism for engines wherein the effective spark advance is greater than the angular displacement of an actuating member of the circuit breaker system from its initially set position with respect to the engine driven cam, the effective spark advance being obtained by moving the actuating member toward the cam axis as the same is moved from its initially set or retarded position to advance the spark.

The invention comprehends the mounting and piloting of an ignition system timing plate without introducing friction in amounts as would interfere with its displacement in response to small values and variations of the suction in the engine manifold.

The invention includes a suction responsive ignition timing mechanism utilizing a pivoted timing plate provided with novel relationships between the point of application of force of the suction responsive device and the position of an actuating element of the circuit breaker system with respect to the plate pivotal point to hold in check objectionable hunting of the plate and prevent chattering of the circuit breaker system contacts.

The invention provides a pivoted ignition timing plate actuated by a device converting engine suction into movement for changing the ignition timing wherein the location of the point of application of force of the converting device and position of the cam follower of a cam operated circuit breaker with respect to the plate pivotal point and cam axis are correlated and arranged to obtain maximum utilization of the force produced by said converting device suppressing objectionable fluttering.

The invention contemplates novel resilient means arranged for urging a pivoted ignition timing plate against a self-lubricating supporting structure at a uniformly distributed predetermined force, preventing cocking or wobbling of the plate without hindering the actuation of the plate by a force of small magnitude whereby the ignition timing can be controlled in accordance with changes of small value of the engine suction.

The invention also includes a suction responsive ignition timing mechanism for an engine utilizing a movable timing plate resiliently urged at a predetermined force on self-lubricating members which are arranged to eliminate binding and drag between moving parts, providing constant and dependable lubrication, thereby dispensing with the use of ball bearings heretofore found necessary.

According to the foregoing summary of the invention indicating its nature and substance, it is an object of the invention to provide an ignition timing structure operable by a vacuum-actuated device, including an ignition timing plate pivoted at a point displaced from the axis of rotation of the engine driven cam and so arranged as to move the ignition circuit breaker in an arc that has a radius greater than the diameter of the cam to obtain thereby an effective spark advance which is greater than the angular displacement of the circuit breaker with respect to the cam.

An object of the invention is the provision of a peripheral self-lubricating bearing having a limited area for mounting an ignition timing plate or adjustable support for the circuit-breaker and the use of the self-lubricating spindle bearing located at a substantial distance from the cam axis for piloting the plate.

An object of the invention resides in locating the point of application of force of a pneumatically operated device to a timing plate and the position of the circuit breaker system with respect to the plate pivotal point in a substantially linear relation to hold in check objectionable hunting that may be induced by the periodic actuation of the circuit breaker system.

An object of the invention resides in locating the point of application of force produced by a device converting engine suction into movement to a pivoted ignition timing plate diametrically opposite to its pivotal point with respect to the cam axis and at a greater distance therefrom than the position of the circuit breaker cam follower with respect to the pivotal point whereby maximum utilization of the force of the converting device is obtained, suppressing objectionable fluttering of the plate.

Another object of the invention is the provision and arrangement of a multi-arm resilient member or tripod-shaped compression spring coacting with the pivot means of the ignition timing plate for urging the plate against a self-lubricating supporting structure at a predetermined uniformly distributed pressure, preventing cocking of the plate and allowing the maximum freedom for angular movement, so that the ignition timing can be controlled in accordance with changes of small value of the engine suction.

Another object of the invention is the provision of a pivoted plate or support for the circuit breaker system, resiliently urged on friction-free, self-lubricating members which contact the face of the plate adjacent to its periphery at points disposed on either side of its pivotal axis, avoiding wobbling and binding without the use of ball bearings or impairment to its operating efficiency.

A further object of the invention resides in substantially eliminating hunting in a cam operated circuit breaker system mounted on an oscillatable support actuated by a spring-loaded suction responsive diaphragm for changing the ignition timing, this object being accomplished by mounting the circuit breaker system, so that the range of movement of the breaker actuating member engageable by the rotary cam takes place in an area diametrically opposite to the axis of oscillation of the support in relation to the cam axis and where the point of connection of the suction responsive device with the support is located at a distance from the cam axis and pivotal point which is greater than the distance of the circuit breaker actuating member from said axis and pivotal point.

A further object of the invention resides in substantially avoiding fluttering in an ignition timing assembly by the provision of a well balanced pivoted timing plate operable by pneumatically operated power means wherein the plate pivotal point is diametrically opposite to the location of the circuit breaker cam follower with respect to the cam axis and the plate pivotal point is displaced from the cam axis at a distance greater than the maximum radius of the cam.

A further object of the invention resides in the novel arrangement of a well balanced pivoted ignition timing plate wherein the pivotal point and the point of application of force of a pneumatically actuated device are diametrically opposite to each other with respect to the cam axis, and the breaker system cam follower is initially set at a point slightly displaced from a plane passing through the cam axis and the plate pivotal point.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is a sectional elevation of one embodiment of the invention;

Fig. II is a plan view taken along lines II—II of Fig. I, looking in the direction of the arrows;

Fig. III is a detailed plan view of the supporting assembly for the breaker contacts;

Fig. IV is a sectional view taken along the lines IV—IV of Fig. III, looking in the direction of the arrows;

Fig. V is a perspective view illustrating the type of resilient means of the invention;

Fig. VI is a bottom plan view of the supporting assembly for the breaker contacts;

Fig. VII is a sectional view taken along the lines VII—VII of Fig. VI; and

Fig. VIII is a diagrammatic view illustrating the relationship and relative positions of the circuit breaker actuating member with respect to the cam in its adjustment to advance the ignition spark.

In the drawings, the invention is shown as incorporated in a combined timer and distributor mechanism used for producing and controlling the ignition of internal combustion engines. However, the principles of the invention are capable of being expressed in a variety of mechanisms and, therefore, it is contemplated to use the invention in other mechanisms and whenever the same may be found to be applicable.

Referring to the drawings, and particularly to Figs. I and II, the combined ignition timer and distributor device embodying the invention is supported within a cup-like, metallic member or timer housing 10, closed at its upper end by detachable cover 12. The cover 12 is preferably formed of high dielectric material provided with inwardly projecting terminal inserts 13 and 14 adapted to receive, at its outer ends, high tension leads forming a distributor cap for receiving and distributing the high tension energy for the fuel ignition means or spark plugs of the engine, not shown.

The timer housing 10 has a downwardly extending tubular shank 15 adapted to be received by a suitable opening in the engine block and held in the desired initial position with respect thereto by means of the adjustable hold-down plate 16. The bore of shank 15 supports a bearing 17 for the driving shaft 18 which is held in position longitudinally with respect to the housing by means of a collar 19. The driving shaft 18 is provided with suitable coupling means such as the tongue 20 for establishing a driving connection with the engine from which the shaft is rotated.

The housing 10 and the distributor cap 12 form a chamber separated by a centrally apertured partition or base-plate 21 into two compartments. The upper compartment houses the timer and distributor mechanism, and the lower compartment, the governor mechanism used for controlling the ignition timing in accordance with the engine speed. The governor mechanism shown in the lower compartment is of the conventional centrifugal type and is operated by the reduced portion 23 of the driving shaft 18, upon which is fixedly mounted a plate or weight support 24 resting on the upper end of the bearing 17. The plate 24 pivotally carries a plurality of weights 25, resiliently urged toward the shaft and each weight is formed with pins 26 projecting into slots 27 provided in a transversely extending plate 28. The plate 28 is rigidly carried by a sleeve 29, to which, in turn, is fixedly secured the cam member 30, the sleeve being journaled for rotation on the reduced portion 23 of the driving shaft 18. The slots 27 of plate 28 are so arranged that outward movement of the weights in response to the engine speed causes the pins 26 to traverse the slots rotating the sleeve and cam member with relation to the driving shaft extension 23. Thus, the timing of the ignition is changed by movement of the cam 30 with respect to the circuit breaker mechanism in accordance with the engine speed.

Means are provided for storing and distributing a lubricant to enhance the freedom of rotary movement between the sleeve 29 and the driving shaft reduced portion 23. In the drawings, these means are shown as two spaced sets of threads or closely related spiral grooves 31 formed on the shaft extension 23 which receive the lubricant from a chamber 32 accommodating a wick 33 or other lubricant-retaining means. The chamber 32 is formed by an enlargement of the end section of the bore of the sleeve 29.

The top section of the sleeve 29 is formed with a flat side 35 to assure correct connection for a detachable distributor member 36 rotated thereby and which closes the lubricant storing chamber 32. The distributor member or rotor 36 is preferably made of high dielectric material formed with a non-cylindrical bore snugly fitting the end of the sleeve and carrying on its upper surface a current-conducting plate 37 by means of a rivet 38. The raised portion of the plate 37 is in engagement with a contact button 39 mounted at the end of the terminal insert 13 and has its outer end terminating in close proximity to a circular row defined by the terminal inserts 14. By this arrangement, the high tension electrical energy or sparking impulses conveyed to the terminal 13 are conducted to the rotor plate 37 and, in turn, distributed in proper timed relation to the engine cylinder igniting means connected to the terminals 14 by rotation of the distributor member 36.

The lateral walls of the housing 10 are formed at their inner surface with a shoulder or ledge 40, upon which is supported the apertured base plate or stationary support 21 with its top flat surface located in a plane transverse to the axis of rotation of driving shaft 18 slightly below the cam member 30. The base plate 21 is secured in fixed position in the housing 10 by the upstanding members or ears 41, 42, and 43, formed at its peripheral edge. The upstanding ears 41 and 42 are diametrically located and have threaded openings for engagement with securing screws 45 and 46 passing through the housing walls. The ear 43 is provided with a suitable aperture adapted to receive insulating tubular means 47 which project through the housing walls for the passage of a conducting screw 48 which acts as securing means and also as means by which an electrical connection can be established between the circuit breaker mechanism and the primary circuit of an ignition device not shown.

The base plate 21 acts as a stationary supporting means for the cam operated circuit breaker assembly of the invention which is oscillatable on an axis offset from the cam axis preferably at a greater distance than the radius of the cam. The circuit breaker system is preferably mounted on an apertured support or movable plate 50 surrounding the cam 30. The movable support 50 is herein designated as the ignition timing plate which, in association with the base plate or stationary support 21, embodies some of the main features of the invention in the control of the ignition timing by engine suction.

The timing plate 50 is supported and piloted for oscillation on an axis eccentric to the cam axis on the self-lubricating means which, as featured by the invention, are positioned and arranged to reduce friction and limit the area of contact with its support, in order that the position of the cam operated member of the ignition timing breaker system can be changed with respect to the cam by a force of very small magnitude.

As particularly shown in Figs. III and IV, the stationary support or base plate 21 is provided, at a substantial distance from the cam axis, with an aperture in which is press-fitted a self-lubricating sleeve or bearing 52 with its flange 53 abutting the top face of the plate, insuring its position therein. The bearing 52 provides a self-lubricating journal for a depending stud or a spindle 55 fixedly secured to the timing plate 50 constituting the pivotal or axis of oscillation of the cam-operated member of the circuit breaker system mounted thereon. The timing plate 50 is supported in a direction transverse to the axis of rotation of the cam in parallel relation to the base plate 21 and slightly below the cam member 30 on self-lubricating bosses or bearing supports 56, 57, and 58 which are fixedly carried by the base plate 21, being press-fitted on suitable apertures as shown.

The bearing supports 56, 57, and 58 are higher than the upper end of the flange 53 and engage the timing plate 50 adjacent to its periphery at points disposed on either side of its pivotal axis forming a self-lubricating, mutilated peripheral bearing of very limited area. Thus the area of contact between the timing plate and its support is materially decreased so as to reduce to a minimum the friction therebetween when the timing plate 50 is moved relative to the stationary plate 21 about the eccentrically located pivot formed by the stud 55 journaled on the self-lubricating sleeve 52. In the form of the invention disclosed, the stationary support or base-plate 21 carries the self-lubricating bearing and the bearing supports 56, 57 and 58 which form the self-lubricating supporting means of limited area for the timing plate 50. However, it is understood that such self-lubricating structures may be provided and carried by the movable support or plate 50.

In order to further enhance the freedom of movement of the timing plate 50, the top surface 59 of each of the bearing bosses is preferably curved, so that the area of contact of the plate on its supporting structure is further decreased. In addition, the timing plate 50 is preferably coated with nickel, acting as an inhibitor, preventing oxidation not only due to the atmospheric elements but to ozone produced by the operation of the make and break devices. Moreover, the stud pin 55 is made of non-oxidizing metallic material such as stainless steel. The coaction of the inhibitor coating, such as nickel, and the stainless steel, with the self-lubricating members is such that an anti-friction supporting structure is obtained without the use of costly ball bearings and the possibility of binding and drag between the parts is practically eliminated, so that objectionable wear is completely avoided.

The anti-friction bearing and supporting structure of the invention, inclusive of the plain bearing 52 and the bosses 56, 57, and 58, are formed of lubricant impregnated bearing material of sufficient porosity to absorb and retain a large quantity of lubricant capable of acting as sufficient reserve. It has been found that porous bearing material, such as the one commercially available and designated as "Oilite," may be effectively used in carrying the invention into practice.

The plate 50 is resiliently urged at a predetermined uniformly distributed pressure on the self-lubricating members 56, 57 and 58 by resilient means carried by the pivot pin 55 reacting on the under side of the stationary plate 21. The resilient means of the invention, in its preferred embodiment, takes the form of a multi-arm resilient member or a tripod-shaped spring 60, particularly illustrated in its free, non-working position in Fig. V. The spider spring 60 is formed of thin, resilient metal, preferably spring steel, with preformed or curved depending arms 61, 62 and 63 extending radially from a uniplanar section 64 which is provided with an aperture adapted to receive the reduced portion 65 forming the lower end of the pivot pin or stud 55. The spring 60 is assembled and held in its working position with the arms 61, 62 and 63 flexed against the under side of the plate 21 through a thrust washer 67 which bears against the planar section 64 and is held thereon by spinning the extremity of the pivot pin as at 68. In order to insure the proper position of the spider spring 60, preventing its rotation, so that one of its arms is always located rearwardly of the bushing 52, struck-out portions 69 are formed on the plate 21, as particularly shown in Figs. VI and VII.

The steps of mounting the timing plate 50 on the stationary support 21 and of holding them by the spinning of the stud as at 68, result in flexing and flattening of the curved arms of the spider spring 60 and produce the supporting assembly for the circuit breaker system shown in Figs. III and VI. The flattening of the spring arms 61, 62, and 63 causes compression of the arch formed thereby, so that the take-up force of the spring 60 is distributed at points displaced from either side of the timing plate pivotal axis, affording greater stability of the timing plate during its movement with respect to the cam. By holding the plate 50 at a predetermined uniformly distributed pressure against the self-lubricating peripheral bearing bosses 56, 57 and 58, any tendency to wobble or sway with respect to the mounting structure is held in check.

Mounted on the movable support or timing plate 50 is the circuit breaker system having an actuating member operable by the lobes 34 of the cam 30 for periodically opening the ignition circuit in timed relation with the rotation of the cam. The circuit breaker system comprises a movable contact 70 engageable with a stationary contact 71. The movable contact 70 is fixed to the free end of a pivoted breaker lever 72 insulatingly mounted by a bushing 73 on the pivot post 74 fixed to the timing plate 50. The stationary contact 71 is attached to an upstanding section 75 of a base member or adjustable bracket 76 also pivoted on the post 74. The bracket 76 is secured in its adjusted position to the timing plate 50 by a screw 77 and may be turned about its pivot by a screw-driver slotted eccentric 79, pivotally supported on the plate 50, coacting with an elongated slot 80 provided in the bracket 76 for varying the amount of separation of the contacts 70 and 71 while retaining the same in parallelism.

The movable contact 70 is normally urged into engagement with the stationary contact 71 by a spring 81 attached at one end to the lever 72 together with circuit breaker actuating member or rubbing block 82 having a cam engaging face 83. The other end of the spring 81 is attached to the upstanding section or ear 84 of an L-shaped bracket insulatingly carried by the timing plate 50. The ear 84 is connected by a lead 85 to the terminal or binding post 48 and by lead 86 to a condenser 87 grounded to the timing plate 50, so that the condenser forms a parallel circuit across the contacts 70 and 71. The timing plate 50 and the stationary or grounded plate 21 are interconnected by means of a conductor or lead 88.

The conductor 88 provides effective current-conducting means and avoids the possibility of pitting the self-lubricating means piloting and supporting the timing plate 50 when the same is moved relative to the cam for changing the engine ignition timing. The leads or conductors 85 and 88 are provided with sufficient amounts of slack in order that the plate 50 may be turned relative to the housing and stationary plate 21, without hindrance by reason of the electrical connections therewith.

Located adjacent to and supported on the exterior of the housing 10 is a motive unit 89 operable to change the position of the circuit breaker actuating member 82 by moving the timing plate 50. In the embodiment shown, the motive unit 89 for converting engine suction into movement is of the conventional fluid-operated type, including a spring-loaded diaphragm or displacement member 90, peripherially held by a pair of cup-shaped members 91 and 92 forming a housing which by means of a bracket 93 is secured by screws 94 to the distributor housing 10. The spring-loaded diaphragm 90 forms, with the cup-shaped member 91, a fluid-tight chamber adapted to be connected to the engine suction by a suitable conduit, not shown.

The diaphragm 91 is provided at its central portion with an operating plunger or connecting link 95 which extends from the side subjected to atmospheric pressure. The link 95 is formed with a notched or recessed section 96 embraced by the small section of aligned apertures or slots 97 provided in the members 92 and 93. The shoulders 98 and 99 of the recessed portion 96 constitute stops that determine the range of movement of the control unit 89 and are arranged so that the force of the diaphragm restoring spring 102 is not transmitted directly to the timing plate 50 in the initially set or retarded position. The link 95 projects through an enlarged opening formed in the wall of the housing 10 and has its end swiveled or connected to a bearing pin 100 fixed to the timing plate 50 by a suitable aperture 101. The bearing pin 100 constitutes the point of application of force of the motive unit 89 for actuating the circuit breaker system to change the engine ignition timing.

In the embodiment shown, the motive unit 89 operates upon the occurrence of suction or low pressure in its fluid tight chamber to displace the diaphragm 90 compressing the restoring spring 102 pulling the link 95 to move the circuit breaker actuating member 82 through the pivoted timing plate 50 counter-clockwise. Movement imparted to the circuit breaker actuating member 82 in counter-clockwise direction will advance the ignition timing as the cam member 30, in the embodiment shown, rotates clockwise, as indicated in Fig. VIII.

The bearing pin 100, as shown in Figs. I and III, is located at a substantial distance from the pivotal point 55 of the timing plate, preferably at its peripheral edge in order to obtain the maximum utilization of the force produced by the motive unit 89. The location of the bearing pin 100, the normal position of the circuit breaker actuating member 82 and its pivotal axis 55 on the timing plate 50 are relatively in a substantially straight line relation, whereby ojectionable hunting that may be induced by the periodic actuation of the circuit breaker system by the cam member 30 is held in check. The point of application of force of the motive unit 89, as determined by the location of the bearing pin 100, is substantially diametrically opposite to the pivotal axis 55 of the circuit breaker actuating member 82 with respect to the cam axis and its distance therefrom is greater than that of the face 83 of the actuating member 82 with respect to the axis of rotation of the cam.

In the embodiment illustrated, the initially set or retard position of the circuit breaker actuating member 82 with repsect to its pivotal point or spindle 55, and in relation with the cam axis, is at a point slightly displaced from a plane passing through the spindle 55 and the cam axis, as shown in Fig. VIII. By the locations and relationships outlined, it should be noted that the circuit breaker actuating member 82 is moved toward the cam axis concurrent with its angular movement with respect to the cam 30 whenever suction is applied to the motive unit 89 to advance the engine ignition timing, permitting the circut breaker actuating member 82 to travel through a shorter angular distance than the actual angular effective ignition timing advance.

Referring particularly to Fig. VIII of the drawings, it can be seen that the circuit breaker actuating member 82, when displaced in a counter-clockwise direction to advance the ignition timing, moves in an arc M whose center of curvature is at O corresponding to the pivotal axis 55 of the timing plate, which is outside of the cam perimeter. The path of movement of the member 82 in arc M is toward the cam axis during its angular displacement P from its initially set or ignition retarded position R to the fully advanced ignition timing position A. During the angular displacement P, the face 83 of member 82 will be struck by the leading angular edge of the rotary cam 30 at points which are further away from the peak of the lobe 34 or at shorter radial distances from the axis of rotation of the cam 30. Thus the face 83 of member 82 is engaged by the cam earlier in its period of rotation than if the face 83 was moved to the fully advanced position A in an arc concentric with the axis of rotation of the cam.

Fig. VIII clearly shows that in its initially set or retarded position R, the point of engagement of the face 83 of the circuit breaker actuating member 82 with the leading edge of the cam 30 forms an angle $x$ with the peak of the cam lobe 34, while in fully advanced position A, the point of engagement of the face 83 with the leading edge of the cam 30 forms an angle $y$ with the peak of the cam lobe 34, and that the angle $x$ is comparatively smaller than the angle $y$. It is, therefore, evident that the angle P is of a smaller value than the effective ignition timing advance that may be represented by the angle T which corresponds to the position of the peak of the cam lobe 34 when the face 83 of member 82 is struck by the leading angular edge of the cam at the retarded and at the fully advanced ignition positions of member 82.

It is clear from the foregoing that, in accordance with the present invention, the mounting for oscillation of the circuit breaker actuating member on an axis positioned outside of the periphery of its operating cam, and so located with respect thereto that the member moves toward the cam during its adjustment to advance the engine ignition timing, produces an effective ignition advance which is greater than the angular travel of said member with respect to the cam from its retarded position. Moreover, the circuit breaker actuating member, through its movable support, is resiliently mounted on self-lubricating means of limited area, so placed as to give it maximum stability without introducing friction in amounts as would interfere with its angular movement with respect to the cam in response to small values and variations of the engine suction. In addition the point of application of force of the engine suction responsive device to the circuit breaker system provides the maximum utilization of such force whereby the engine ignition timing is controlled in accordance with changes of small magnitude in the engine suction, permitting the use of a small distributor and suction device.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. An ignition timing device for an internal combustion engine including a housing, a rotary cam in said housing, an ignition timing circuit breaker system provided with an actuating element adapted to be periodically engaged by the cam for moving the circuit breaker to open position, mounting means for said circuit breaker system said means being pivoted at a point displaced from the axis of rotation of the cam at a greater distance than the maximum radius of the cam, said means arranged to move the circuit breaker actuating element in an arc that has a radius greater than the diameter of the cam to obtain in substantially all of its adjustment an effective spark advance which is greater than the angular travel of the circuit breaker actuating element with respect to the cam, means located adjacent to and exterior of the housing for converting engine suction into movement, and means connecting said converting means with said mounting means for controlling the ignition timing in response to the engine suction.

2. An ignition timing mechanism for internal combustion engines including a rotary cam, a circuit breaker system operated by said cam for actuating the circuit breaker to open position, means for angularly moving said circuit breaker system on an axis which is located outside of the perimeter of said cam to advance or retard the timing of the ignition spark said means being operable in substantially all of its adjustment to advance the timing of the spark to move the circuit breaker system toward the cam axis to obtain greater effective timing advance of the ignition spark for the angular travel of the circuit breaker system with respect to the cam, and a pneumatic mechanism actuated by the engine suction for operating said means whereby the ignition timing is controlled in response to the engine suction.

3. An ignition timing mechanism for internal combustion engines including a rotary cam, circuit breaker contacts normally closed, a member operated by said rotary cam for periodically opening said contacts to produce the engine ignition, means angularly adjustable supporting said cam operated member to change its position with respect to said cam to advance or retard the engine ignition timing, said angularly adjustable supporting means having an axis located outside of the perimeter of the cam and being arranged with respect to said cam as to be operable in substantially all of its angular adjustment to advance the ignition timing to concurrently move the member operated by the cam toward the cam axis whereby the effective ignition timing advance obtained thereby is greater than the angular travel of the cam operated member from its initially set position.

4. In an ignition timing device for an engine having a housing, a rotary cam in said housing, and an angularly adjustable timing plate carrying the circuit breaker system, the combination with said timing plate, of a peripheral self-lubricating bearing having a limited area for mounting the timing plate, a self-lubricating spindle bearing means located at a radial distance from the cam axis which is greater than the cam radius for piloting the timing plate in its angular adjustment, and a suction-responsive device connected to the periphery of the timing plate for adjusting the same angularly changing the position of the circuit breaker system with respect to the rotary cam for changing the ignition timing.

5. An ignition timing device for an engine including a rotary cam, circuit breaker contacts normally closed, an actuating element adapted to be periodically engaged by said cam for opening said circuit breaker contacts, mounting means pivoted at a point located outside of the perimeter of the cam for supporting and moving said element angularly with respect to said cam, pneumatic means connected to said mounting means for changing the engine ignition timing the arrangement being such that a substantially straight line relationship can be established between the point of application of force of the pneumatic means, the location of the actuating element, and the pivotal point of the mounting means.

6. In an ignition timing device for an engine having a housing, and a rotary cam in said housing, the combination therewith, of a self-lubricating supporting structure in said housing, a pivoted ignition timing plate adapted to be moved with respect to said cam on a pivotal axis located outside of the perimeter of the cam, a multi-arm resilient member located at the pivotal axis of the timing plate urging the timing plate against said supporting structure at a predetermined uniformly distributed pressure, and suction-responsive means for moving the timing plate with respect to the rotary cam for changing the engine ignition timing in response to engine suction.

7. In an ignition timing device for an engine having a housing, a rotary cam in said housing, and a support carried by the housing, the combination with said support, of a mutilated peripheral bearing carried by the support, an ignition timing plate having pivot means on the support, a tripod-shaped compression spring coacting with the timing plate pivot means and reacting on said support for urging the plate against the mutilated peripheral bearing at a predetermined uniformly distributed pressure, and means for angularly displacing the timing plate with respect to the rotary cam for changing the ignition timing.

8. An ignition timing device for an engine including a rotary cam, a contact carrying breaker arm and a relatively fixed contact cooperating therewith, oscillatable supporting means for said breaker arm contact and said relatively fixed contact, pivotal means for said supporting means located outside of the perimeter of the cam whereby said supporting means are adjustable angularly about said cam in a plane transverse to the cam axis for moving said contacts in an arc having a radius greater than the diameter of the cam, pneumatic actuated mechanism connected to said supporting means for adjusting the same angularly about said cam to advance or retard the ignition spark, said pneumatic actuated mechanism comprising a spring-loaded diaphragm operable by suction to advance the timing of the spark, means for connecting said diaphragm to said supporting means including a link provided with stop means for determining the range of angular movement of the movable supporting means with respect to the cam.

9. An ignition timing device for an engine including a rotary cam, circuit breaker contacts normally in engagement and adapted to be periodically moved out of engagement by said cam, means angularly adjustable about said cam for changing the position of said circuit breaker contacts about said cam to advance or retard the ignition timing, said means being operable on an axis located outside of the maximum radius of the rotary cam so that in substantially all of its adjustment to advance the spark the breaker contacts are moved angularly as well as toward the cam axis whereby the effective spark advance produced by the angular displacement of the breaker contacts with respect to the cam is increased by adding thereto the advance increment secured by moving the breaker contacts toward the cam axis.

10. In an ignition device for an internal combustion engine having a housing, a rotary cam supported by the housing, and a circuit breaker operated by the cam, the combination therewith, of a supporting assembly for the circuit breaker including a pair of plates, one of said plates pivoted on the other plate on an axis eccentric with respect to the axis of the cam having a radial distance therefrom greater than the maximum radius of the cam, self-lubricating bearing supports carried by one of said plates and engageable with the other plate substantially at its periphery, and resilient means carried by one of said plates reacting on the other plate for urging the pivoted plate against said bearing supports whereby wobbling movement between the plates is prevented.

11. In an ignition timing device for an engine having a rotary cam, a circuit breaker system including a cam follower operated by said cam for actuating the circuit breaker system to open position, the combination with said circuit breaker system, of a supporting assembly for said circuit breaker system including a pair of substantially parallel plates, one of said plates being relatively stationary, the other of said plates surrounding the cam and being pivoted on said relatively stationary plate on an axis located outside of the perimeter of the cam eccentric with respect to the cam axis for movement in a plane substantially transverse to the cam, self-lubricating bearing members carried by the stationary plate for engagement with the lower face of the pivoted plate substantially at its periphery, and multi-armed resilient means carried by one of said plates reacting on the other plate for establishing contacting engagement of the lower face of the pivoted plate with said bearing members at a predetermined uniform pressure.

12. An ignition timing device for an engine including a rotary cam, a circuit breaker system including a cam follower controlled by said rotary cam for actuating said circuit breaker system to open position to produce the engine ignition, a timing plate surrounding said rotary cam pivoted on an axis located outside of the perimeter of said rotary cam and angularly adjustable to vary the location of said cam follower about said rotary cam for changing the engine ignition timing, said pivoted timing plate operable in substantially all of its movement to advance the engine ignition timing to move said cam follower toward the axis of rotation of said cam, and an engine suction responsive device connected to the outer periphery of said pivoted timing plate for moving said cam follower to change the ignition timing in response to the suction in the engine manifold.

References Cited in the file of this patent

UNITED STATES PATENTS

| Number | Name | Date |
| --- | --- | --- |
| 2,125,367 | Arthur et al. | Aug. 2, 1938 |
| 2,249,446 | Vanderpoel et al. | July 15, 1941 |
| 2,348,236 | Arthur | May 9, 1944 |
| 2,390,050 | Bales | Dec. 4, 1945 |
| 2,450,805 | Mallory | Oct. 5, 1948 |
| 2,487,231 | Fitzsimmons | Nov. 8, 1949 |